United States Patent [19]

Kishino et al.

[11] Patent Number: 4,823,689

[45] Date of Patent: Apr. 25, 1989

[54] ELASTIC ROLLER WITH INTERNAL OPENINGS FOR USE WITH IMAGE FORMING APPARATUS

[75] Inventors: Kazuo Kishino, Kawasaki; Takao Tanaka, Yamato; Michio Shigenobu, Tokyo; Hiromitsu Hirabayashi, Yokohama; Takashi Hibi, Kodaira; Kensaku Kusaka, Kawasaki, all of Japan

[73] Assignee: Canon Kabushiki Kaisha, Tokyo, Japan

[21] Appl. No.: 26,975

[22] Filed: Mar. 17, 1987

[30] Foreign Application Priority Data

| Mar. 18, 1986 | [JP] | Japan | 61-058297 |
| Mar. 18, 1986 | [JP] | Japan | 61-058299 |
| Mar. 18, 1986 | [JP] | Japan | 61-058300 |
| Apr. 21, 1986 | [JP] | Japan | 61-090152 |
| Apr. 21, 1986 | [JP] | Japan | 61-090153 |
| Apr. 21, 1986 | [JP] | Japan | 61-090154 |
| Apr. 21, 1986 | [JP] | Japan | 61-090155 |
| Apr. 21, 1986 | [JP] | Japan | 61-090156 |
| Apr. 21, 1986 | [JP] | Japan | 61-058776[U] |

[51] Int. Cl.⁴ ............................ B30B 3/00; B30B 3/04
[52] U.S. Cl. ............................ 100/155 R; 100/172; 100/176; 29/132
[58] Field of Search ........... 355/14 FU, 3 FU; 29/132, 121.1, 121.2, 121.6, 121.7; 100/155 R, 160, 172, 176, 163 A, 163 R, 164, 165, 155; 428/314.2; 206/599

[56] References Cited

U.S. PATENT DOCUMENTS

| 2,054,620 | 9/1936 | Freedlander | 29/132 X |
| 2,572,276 | 10/1951 | Moe | 100/155 R |
| 2,902,199 | 9/1959 | Breton | 206/599 X |
| 3,449,548 | 6/1969 | Adamek et al. | 29/132 X |
| 4,309,803 | 1/1982 | Blaszak | 29/132 X |
| 4,425,694 | 1/1984 | Somerville | 29/132 X |
| 4,533,231 | 8/1985 | Shigenobu | 355/3 FU |

*Primary Examiner*—Andrew M. Falik
*Attorney, Agent, or Firm*—Fitzpatrick, Cella, Harper & Scinto

[57] ABSTRACT

An elastic rotatable member includes a base member, an elastic layer on the base member, the elastic layer defining a plurality of opening extending in a longitudinal direction of the elastic rotatable member, wherein the openings are arranged such that any radial line in a cross-section of the elastic rotatable member in a direction substantially perpendicular to the longitudinal direction, crosses at least two of such openings.

42 Claims, 8 Drawing Sheets

ELASTIC ROLLER WITH INTERNAL OPENINGS FOR USE WITH IMAGE FORMING APPARATUS

FIELD OF THE INVENTION AND RELATED ART

The present invention relates to an elastic rotatable member and a fixing apparatus using the same, more particularly to such an elastic rotatable member which is contactable with another member.

The elastic rotatable member according to the present invention is applicable to a conveying roller, a fixing roller, or an electrically charging roller or the like usable with an image forming apparatus such as a copying machine, printer and facsimile machine. In this specification, the description will be made with respect to an image fixing roller using the elastic rotatable member according to the present invention, but the present invention is not limited to this application. It is conventional that an elastic roller (the elastic rotatable member) is required to elastically deforms at the position of contact with another member such as a roller or a belt under a certain level of pressure. It is desired that the elastic roller is easily elastically deformed so that the contact pressure is substantially uniform within the area of contact. When the elastic roller rotates, the area of contact with the other member moves, and in such a case, it is desirable that the contact pressure is constant irrespective of portions of the surface thereof. As an example of such a rotatable roller, there are conveying rollers, image fixing rollers and cleaning rollers in the image forming apparatus.

The elastic rollers, which are rotatable, particularly those for an image fixing, desirably have a low hardness of the material of the elastic roller so as to assure the satisfactory area of a nip for image fixing while satisfying the above-described requirements. However, it is known that when a solid rubber having a low hardness is used, the property of the low hardness leads to at decrease in the durability and strength of the roller, and therefore, there is a limitation that decreasing of the hardness can be achieved only by decreasing the material hardness.

On the other hand. U.S. Pat. No. 4,533,231 discloses another type of low hardness roller, wherein the elastic roller has a solid surface rubber layer having a predetermined hardness and has a sponge layer between the surface rubber layer and a core metal member. The roller is formed by foaming the sponge. However, it has been found that it is difficult to produce the satisfactory sponge with a dimensional stability, uniform hardness, foaming density, void density and foam structure (independent pores or continuous pores) and other satisfactory properties. Additionally, the manufacturing cost is high.

The low hardness of the elastic roller without use of sponge layer is proposed in U.S. Pat. No. 3,449,548, wherein a plurality of opening slits are formed in the body of the rubber roller. However, the roller having the structure shown in FIGS. 3 and 4 of the U.S. Patent, has different roller surface hardness between the surface portions opposed to the opening slits and the portions opposing the post portions between the opening slits. This results in non-uniform contact pressure or non-uniform contact area with respect to the member to which the roller is contacted, and therefore, no satisfactory fixing performance can be provided.

Therefore, it is desired to provide an elastic roller having a property suitable for the apparatus which is used with the roller.

SUMMARY OF THE INVENTION

Accordingly, it is a principal object of the present invention to provide an elastic rotatable member having a uniform and low hardness with high durability.

It is another object of the present invention to provide an elastic rotatable member, by which when it is contacted with another member, the contact pressure is uniform within the area where they are contacted.

It is a further object of the present invention to provide an elastic rotatable member by which the area of contact can be assured satisfactorily.

It is a further object of the present invention to provide an elastic rotatable member which is simple and not costly in manufacturing it.

It is a further object of the present invention to provide an elastic rotatable member and an image fixing apparatus using the same which can provide better image fixing properties.

These and other objects, features and advantages of the present invention will become more apparent upon a consideration of the following description of the preferred embodiments of the present invention taken in conjunction with the accompanying drawings.

DETAILED DESCRIPTION OF THE PREFERRED EMBODIMENTS

Figure 1:
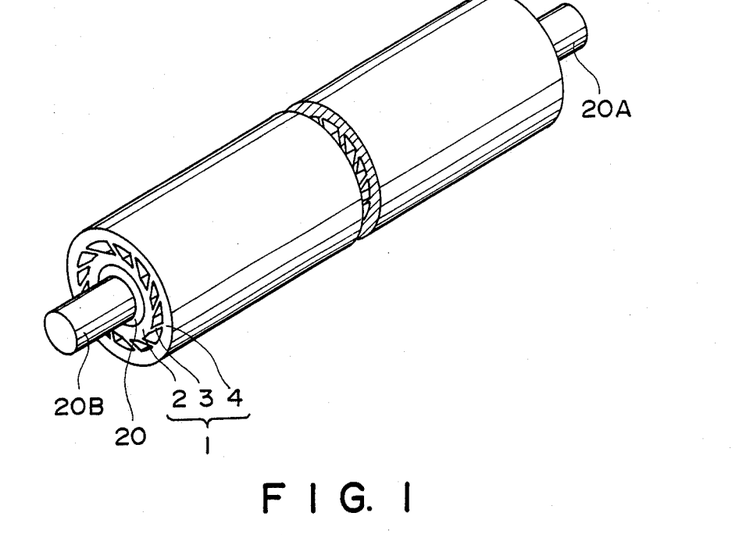
FIG. 1 is a perspective view of an elastic roller according to an embodiment of the present invention.
Figure 2:
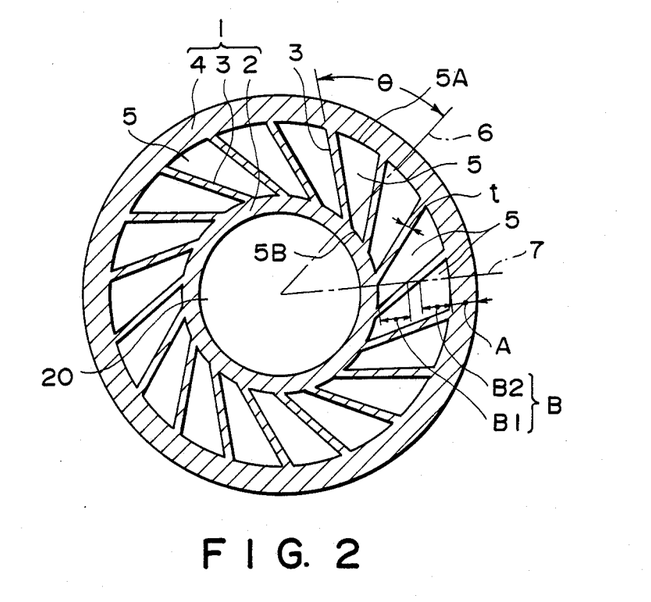
FIG. 2 is a cross-sectional view of the elastic roller of FIG. 1.

Referring to FIGS. 1 and 2, there is shown an elastic roller as the elastic rotatable member according to the embodiment of the present invention. In FIG. 1, the roller is shown as being cut in the middle thereof for the sake of explanation.

In this embodiment, the elastic roller comprises a core metal member 20 and a cylindrical elastic layer 1 formed around the core metal member 20 integrally therewith. To the opposite ends of the core metal member 20, shafts 20A and 20B are mounted which are to be rotatably supported on bearings in use of the elastic roller. The elastic layer 1 is formed integrally with the core metal member 20 with the exception of the shafts 20A and 20B.

The elastic layer comprises a cylindrical base layer 2 contacted to the core metal member 20, a plurality of post portions 3 extending from the base layer 2 radially outwardly and a cylindrical surface layer 4 connecting the post portions 3. The post portions 3 are circumferentially distributed at substantially regular intervals and are extended substantially prallel with the core metal member 20. A plurality of openings 5 are formed by adjacent post portions 3, an iouter surface of the base layer 2 and an inside surface of the surface layer 4. The openings 5 extend parallel to the core metal member 20 and are circumferentially distributed at substantially regular intervals.

As best seen in FIG. 2, each of the post portions 3 is inclined with respect to an arbitrary radial line 6 of the elastic roller with an angle $\theta$, and therefore, it is asymmetrical with respect to radial line, so that any given radial line 6 crosses two or more openings 5. For example, the radial line 6 or 7 crosses two openings 5. The angle $\theta$ and thickness t of the post portion 3 are determined relatively so as to satisfy this requirement. As for the actual devices, however, they are determined, together with the thicknesses of the base layer 2 and the surface layer 4, so as to provide a desired hardness of the elastic roller.

In use of the elastic roller according to this embodiment, when the elastic roller is contacted to another member, the degree of deformation is the same irrespective of circumferential positions of the surface layer, since ay radial line 7 crosses two or more openings 5, and moreover, in this embodiment, the roller is easy to deform as a whole since the post portions 3 are inclined. The surface layer 4 having a substantially uniform thickness is effective to make the degree of deformation uniform over the entire circumference of the roller, to such an extent that there is hardly any difference between the deformations adjacent the openings and adjacent the post portions. The surface layer 4 is also effective to provide a predetermined surface strength.

It is preferable that the thickness of the surface layer 4 is not less than 0.3 mm, and a dimension of the opening 5 measured along a radial line is larger than the thickness of the surface layer 4. More particularly, referring to FIG. 2, wherein any radial line 7 crosses two or more openings 5, the total dimension of the openings 5 measured along the radial line 7, that is, $B=B1+B2$ is larger than the thickness A of the surface layer 4.

Because of this dimensional relationship, $B>A$, the last portions 3 are easily deformed, and therefore, the roller as a whole is easy to deform.

Various experiments performed by the inventors have revealed that the lower limit of the surface layer 4 thickness is about 0.3 mm, and that an outer diameter of the elastic roller and material of the elastic layer are not so influential. For example, when the elastic roller is used as an image fixing roller in a copying machine, if the surface layer has a thickness less than 0.3 mm, the image fixing performance is not good enough with production of non-uniform image fixing and paper wrinkles. When uniform and good heat conduction is required as an image fixing roller, the thickness of the surface layer is preferably not less than 2 mm.

Also, various experiments have been carried out with respect to the thickness of the post portions 3, and it has been found that it is preferable that the thickness is not less than 0.2 mm in order to stabilize the configuration of the openings when the roller is deformed. From the standpoint of easy deformation, on the other hand, it is preferable that the thickness is not more than the thickness of the surface layer.

As described, in the foregoing, each of the post portions 3 has the same thickness 2 and is inclined by an angle $\theta$ with respect to a radial line 6. Also, extensions of the post portions 3 do not pass the center of the elastic roller, and therefore, it is asymmetrical with respect to any radial line 6. Therefore, each of the openings 5 has a trapezoidal configuration having an outer side 5a and an inner side 5b which is shorter than the outer side 5a. The total volume of the openings 5 is 20–60% of the elastic layer 1 including the openings 5, and preferably, it is 30–50%. If it is less than 20%, the hardness of the roller is too high, thus losing the good feature of the low hardness, and a heat capacity of the roller itself is too large. If the percentage of the opening volume is large, the heat capacity of the roller becomes low, but if it is larger than 60%, there is a tendency that the non-uniform hardness of roller results, and in addition, the thickness of the post portion of the elastic layer 1 becomes so small that the durability is deteriorated. When the elastic roller is used as an image fixing device, good image fixing property and durability can be provided if the volume percentage of the openings are within the range described above. Particularly, when the elastic roller is used as a pressing roller which is press-contacted to a heating roller in an image fixing device, and if the volume percentage of the openings are made within that range, the lower heat capacity makes it possible to quickly increase the surface temperature of the pressing roller, and therefore, the waiting time is reduced with the good image fixing property and durability maintained.

In the foregoing embodiment, the openings are of trapezoidal cross-sections distributed in a single line along a circumferential direction. However, the configuration and the arrangement of the openings are not limited to those of this embodiment.

Figure 3:
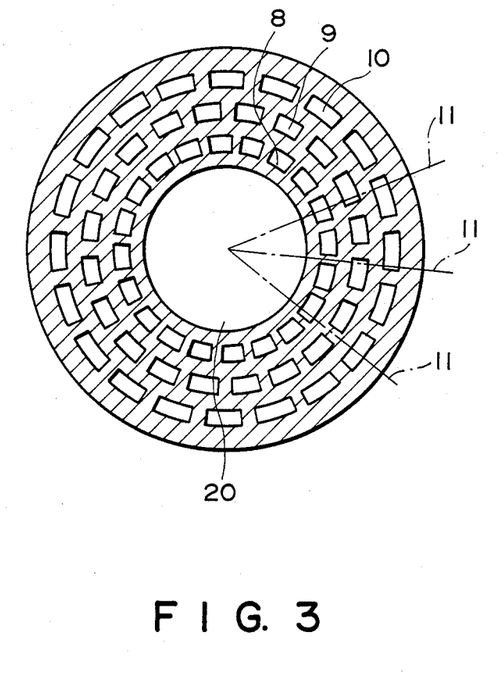
FIG. 3 is a cross-sectional view according to another embodiment of the present invention.

FIG. 3 shows a modification, wherein the openings have substantially rectangular configurations, and the openings are arranged in three lines, as inside openings 8 arranged in an inside circumferential line, intermediate openings 9 arranged in an intermediate circumferential line and external openings 10 arranged in an outer circumferential line. Those openings are arranged such that any radial line 11 crosses two or more openings. In this embodiment, the number of the openings is increased with increase of the number of the lines along which they are arranged, and therefore, the roller is easily deformed, and in addition, the degree of deformations is uniform irrespective of the angular position of the roller. In this embodiment, it is also preferable that the dimensional relations between the thickness of the surface layer and the radial dimensions of the openings and the percentage of the opening volumes, are selected in the same manner as in the embodiment of FIGS. 1 and 2.

Referring back to FIG. 2, the openings are shown as extending parallel with the axis of the core metal member 20, but this is not always necessary.

Figure 4:
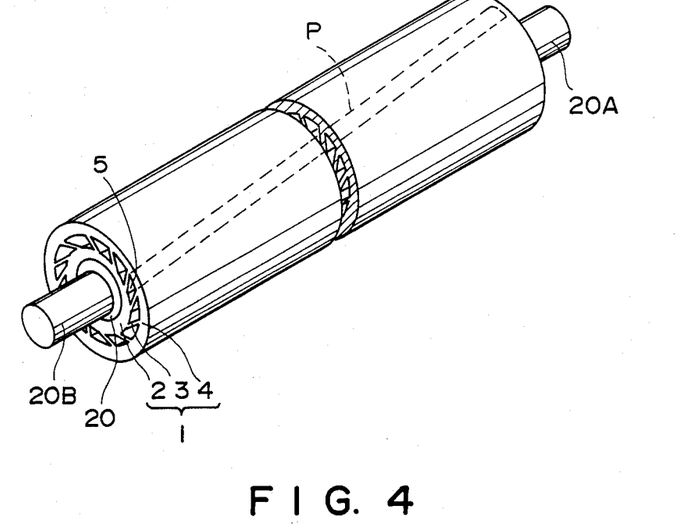
FIGS. 4 and 5 are perspective views of elastic rollers according to further embodiments of the present invention.
Figure 5:
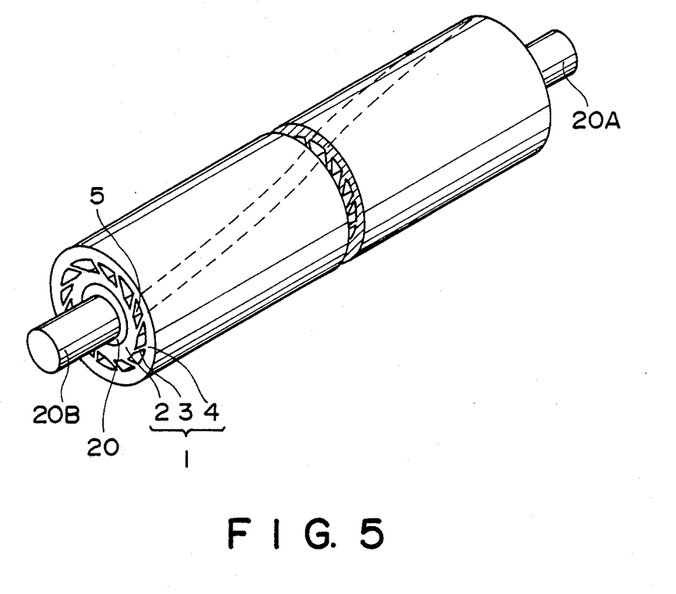

FIGS. 4 and 5 show other embodiments. In FIG. 4, each of the openings 5 extends along a phantom rectilinear line P connecting a point in an end surface of the elastic layer 1 and a point in the other end surface thereof which is away from the center of the elastic layer 1 by the same distance and is circumferentially away by a predetermined angle. That is, the opening 5 extends inclined by a predetermined angle from the axis. The opening 5 are circumferentially distributed at substantially regular circumferential intervals. By this arrangement, along a line parallel to the longitudinal axis on the roller surface, there are openings 5 and post portions 3 alternately under the surface, by which the degree of the deformation of the elastic roller is made uniform through the existence of the surface layer 4 along the line.

In FIG. 5, each of the openings 5 extends conically with a constant radial distance from the axis of the roller. The openings 5 are distributed at substantially regular intervals along the circumferential direction. By this, along a line parallel to the axis of the roller at the outer surface of the roller, distances of the positions of the openings 5 from the outer surface are constant irrespective of positions on the line. In addition, there are openings 5 and post portions 3 alternately under the surface along the line, by which the degree of deformation is made uniform in the longitudinal and circumferential directions through the existence of the surface layer 4.

In the embodiment of FIGS. 4 and 5, the openings 5 are arranged such that any radial line crosses at least two openings.

Description will be made with respect to the performance of the elastic roller when used in an image fixing apparatus for a copying machine.

Figure 6:
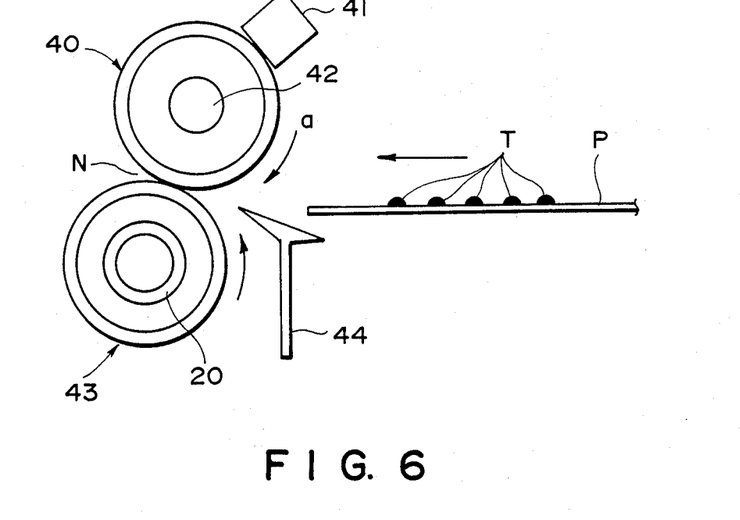
FIG. 6 is a sectional view of an image fixing apparatus according to a further embodiment of the present invention.

FIG. 6 is a schematic sectional view of the heating type image fixing apparatus, wherein an image fixing roller 40 has an aluminum core member having an outer diameter of 25 mm and a thickness of 1.4 mm, coated with a fluorine resin layer having a thickness of about 25 microns. Within the fixing roller 40, there is provided a halogen heater of 1.1 KW as a heating element 42. To the surface of fixing roller 40 a thermister is contacted as a temperature sensor 41. The surface temperature of the fixing roller 40 is controlled to be maintained at 180° C. To the fixing roller 40, an elastic roller is press-contacted as a pressing roller 43, which is press-contacted to the fixing roller 40 under a total pressure of about 6 kgf providing by an unshown pressing means. The pressing roller 43 has a core metal of stainless steel having an outer diameter of 10 mm and an elastic layer (elastic rubber layer) having the configuration shown in FIG. 2 or 3 and having an outer diameter of 24 mm, an effective circumferential length of 230 mm and a thickness of 7 mm. The surface hardness of the roller is 24 degrees (Asker C, measured at 300 g weight). The fixing roller 40 is rotated by an unshown driving source at a circumferential speed of 66 mm/sec in the direction of an arrow a. The pressing roller 43 is rotatably supported so as to be driven by the fixing roller 40. Those rollers form a nip N, through which a recording material P bearing an unfixed toner image T formed by resin toner is passed, by which the toner image is heated and pressed, and therefore, is fixed. The recording material P is guided to the nip N by a guide 44.

The image fixing operations were performed for A4 (JIS) size sheets having unfixed toner images at a speed of 8 sheets/min.

Figure 7:
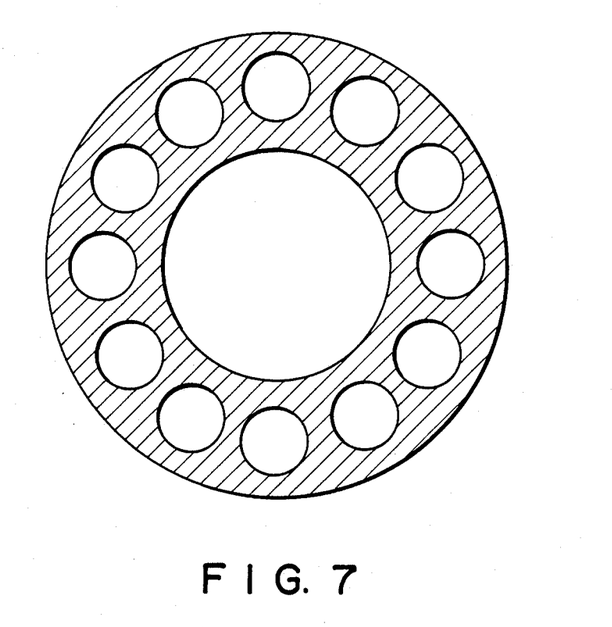
FIG. 7 is a sectional view of an elastic roller to be compared with the elastic rollers shown in FIGS. 2 and 3.

As a comparison example, a roller having a cross-section shown in FIG. 7 was used as the pressing roller, and the similar operations were performed.

The results of comparison are shown in Table 1. The material of all of the elastic rollers were the same, more particulrly, SH850 A/B LTV available from Toray-Silicone Kabushiki Kaisha.

TABLE 1

| | OPENING SHAPE | HARDNESS (ASKER C: DEG.) | | | | FIXING PROPERTY | | | |
|---|---|---|---|---|---|---|---|---|---|
| | | INITIAL | $10^4$ | $10^5$ | $2 \times 10^5$ | INITIAL | $10^4$ | $10^5$ | $2 \times 10^5$ |
| EMBODIMENT/1 | FIG. 2 | $24 \pm 2$ | $24 \pm 2$ | $24 \pm 3$ | $24 + 3$ | E | E | E | G |
| EMBODIMENT/2 | FIG. 3 | $33 \pm 5$ | $33 \pm 5$ | $35 \pm 6$ | $35 \pm 6$ | G | G | G | G |
| COMPARISON EXAMPLE | FIG. 7 | $33 \pm 9$ | $33 \pm 9$ | $34 \pm 11$ | $34 \pm 12$ | G | G | G | F |

| | OPENING SHAPE | WRINKLE | | | | UNIFORMNESS | |
|---|---|---|---|---|---|---|---|
| | | INITIAL | $10^4$ | $10^5$ | $2 \times 10^5$ | INITIAL | $2 \times 10^4$ |
| EMBODIMENT/1 | FIG. 2 | G | G | G | G | G | G |
| EMBODIMENT/2 | FIG. 3 | G | G | G | G | G | G |
| COMPARISON EXAMPLE | FIG. 7 | G | G | G | G | F | B |

E: Excellent
G: Good
F: Fair
B: Bad

As will be understood from Table 1, the comparison example shows fairly good results with respect to the fixing property (toner deposition rate to a sheet) and wrinkles, but actually, there is produced non-uniformness of the fixing by which the image is firmly fixed in a certain area, and it is unsatisfactorily fixed in the other area. Therefore, the comparison example is not satisfactory from a practical standpoint.

According to the embodiments of FIGS. 2 and 3, no non-uniform image fixing or a wrinkle were not produced even after 200,000 sheets were fixed, and therefore, the sufficient durability and stability were confirmed. Particularly, the elastic roller of the first embodiment showed less variation of the hardness, and the hardness was lower than the other rollers, and best results were confirmed.

When the elastic roller according to the present invention is used as a roller for image fixing as shown in FIG. 6, it is preferable that the direction of rotation is selected depending on whether the roller is a driving roller or a driven roller, in the following manner.

Figure 8:
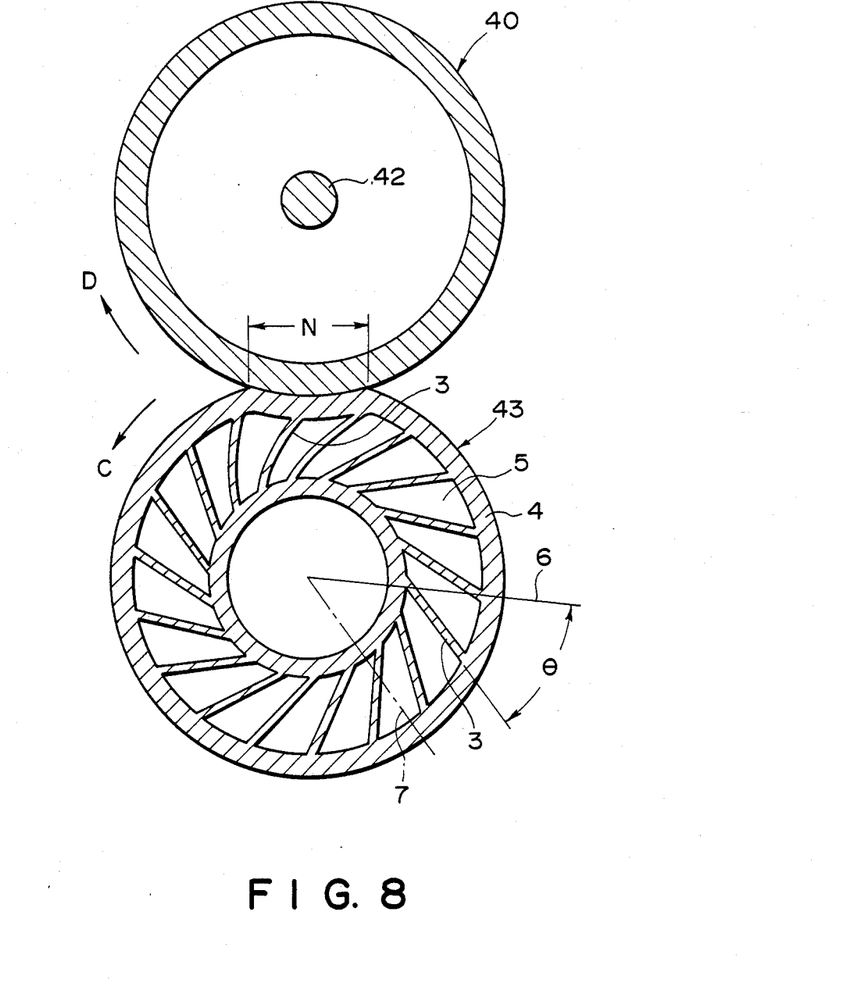
FIG. 8 is a cross-sectional view of a pair of rollers illustrating rotation of the rollers wherein a fixing roller is a driven roller, and a pressing roller is a driving roller.

FIG. 8 shows an embodiment of an image fixing device, wherein a pressing roller 43 is an elastic roller shown in FIG. 2 driven by an unshown driving source, and it is press-contacted to an image fixing roller 40 which is driven by the pressing roller 43 through friction at the nip N. Therefore, in this embodiment, the pressing roller 43 is a driving roller, while the fixing roller 40 is a driven roller. The pressing roller 43 rotates in the direction of an arrow C, while the fixing roller 40 rotates in the opposite direction D. In this arrangement, the rotational direction C of the pressing roller 43 is such that the angle $\theta$ of the post portions 3 is increased when the pressing roller 43 elastically is deformed by the press contact In this embodiment, when the pressing roller 43 rotates while press-contacting the fixing roller, it is easy to deform since the post portions 3 are codirectionally inclined, and therefore, the force exerted by the driven (fixing) roller is effective to further incline the post portions 3. Additionally, since any radial line 7 crosses two or more openings 5, the degree of deformation is the same irrespective of the circumferential positions of the pressing roller. Furthermore, the constant thickness of the surface layer 4 makes the degree of deformation further uniform along the circumference of the pressing roller 43. Still, the surface layer 4 of the roller maintains the predetermined surface strength. Because of those effects, uniform and good image fixing properties can be provided.

If, in FIG. 8 wherein the pressing roller 45 is a driving roller, and the fixing roller 41 is a driven roller, the rollers are rotated in the opposite directions, the angle of inclination of the post portions 3 of the pressing roller 43 is decreased at the nip N, with the result that the image fixing roller receives too large force from the post portions 3 at positions of connection between the surface layer 4 and the post portions. Therefore, the hardness on the roller surface varies. It follows the non-uniform fixing occurs, wherein strongly fixed portions appear periodically. Therefore, in the driving and driven relation shown in FIG. 8, it is not preferable that the pressing roller 43 and the fixing roller 40 are rotated opposite to the directions C and D, respectively.

Figure 9:
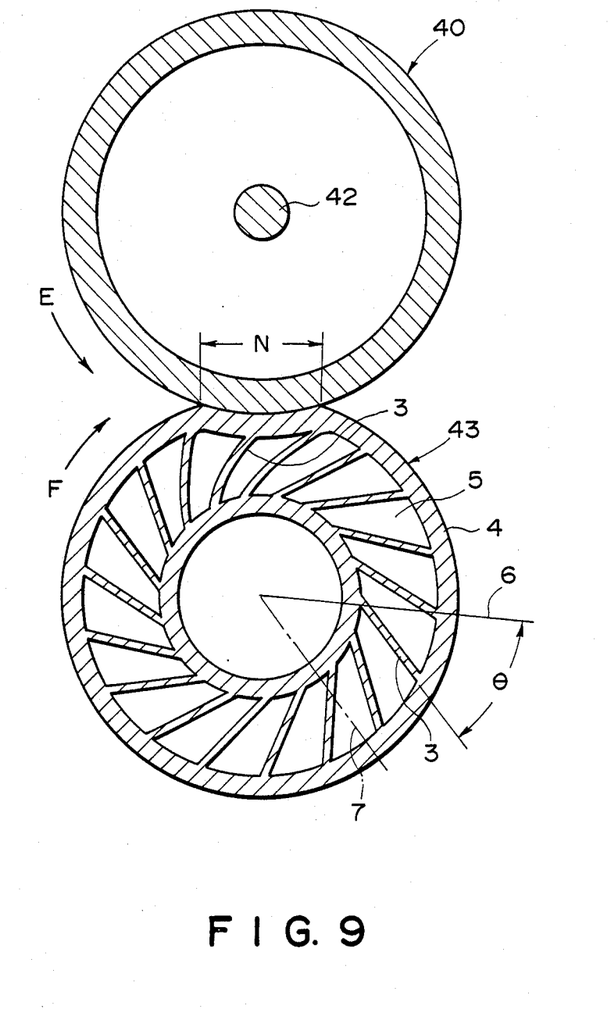
FIG. 9 is a cross-sectional view of a pair of rollers illustrating rotation of the rollers wherein a fixing roller is a driving roller, and a pressing roller is a driven roller.

FIG. 9 shows an example wherein an elastic roller having the cross-sectional configuration of FIG. 2 is shown as a pressing roller 43, and an image fixing roller 40 is driven by an unshown driving means, wherein the fixing roller 40 drives the pressing roller 43 by friction at the nip N therebetween. Therefore, in this example, the fixing roller 40 is a driving roller, while the pressing roller 43 is a driven roller. The fixing roller 40 rotates in the direction E, while the pressing roller 43 is driven to rotate in the direction F. The rotational direction F of the pressing roller 43 (driven roller) is such that the angle of inclination of the post portions 3 is increased when the pressing roller 43 is elastically deformed by the pressure contact while it is rotating.

In this embodiment, when the pressing roller 43 rotates while press contacting to the fixing roller 40, it is easily deformed because of the codirectional inclination of the post portions 3. That is, the force received by the pressing roller from the driving (fixing) roller is effective to further incline the post portions 3, and therefore, the pressing roller, as a whole, is easily deformed. Additionally, the openings 5 are formed such that any radial line 7 crosses at least two openings, the degree of deformation is the same irrespective of the circumferential positions of the pressing roller. Furthermore, the uniform thickness of the surface layer 4 is effective to make the deformation further uniform along the circumferential direction. Still, the surface layer 4 assures the predetermined surface strength. By those features, nonuniform and good image fixing properties can be provided.

If, in FIG. 9 wherein the fixing roller 40 is a driving roller, and the pressing roller 43 is a driven roller, the rollers are rotated in the opposite directions, the angle of inclination of the post portions 3 of the fixing roller 43 is decreased by the press-contact during rotation, and other result, too large force is exerted from the post portions 3 at the position of connection between the surface layer 4 and the post portions 3. This results in non-uniform hardness of the roller surface, and therefore, the image fixing is not uniform, wherein strongly fixed portions appear periodically. Therefore, in the driving and driven relation shown in FIG. 9, it is not preferable that the fixing roller 40 and the pressing roller 43 are rotated in the directions opposite to the directions E and F, respectively.

Figure 10:
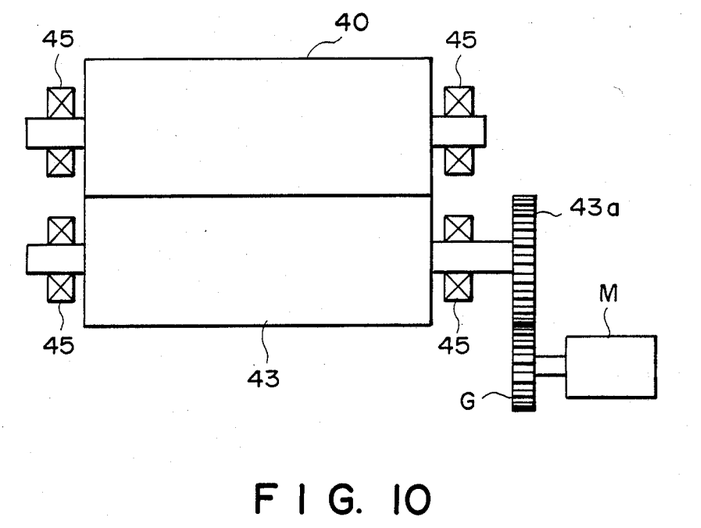
FIG. 10 is a side view of a driving system for the image fixing apparatus shown in FIG. 8.
Figure 11:
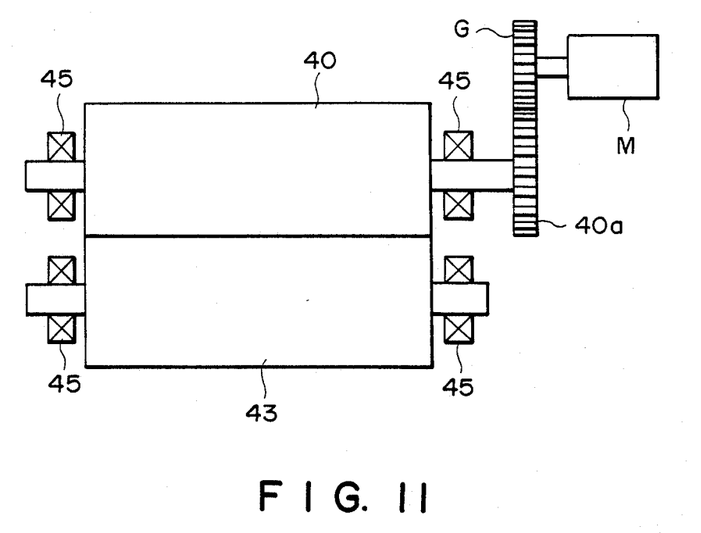
FIG. 11 is a side view of a driving system of an image fixing apparatus of FIG. 9.

FIGS. 10 and 11 show driving systems to be used with FIGS. 8 and 9 embodiments.

In FIG. 10, usable with FIG. 8 embodiment, a gear 43a mounted on a shaft of the pressing roller 43 is meshed with a gear G of a motor M, and driving force is applied to the pressing roller 43 from a motor M. Therefore, the pressing roller 43 is a driving roller, while the fixing roller 40 is a driven roller which is driven by the pressing roller 43.

FIG. 11 illustrates a driving system usable with FIG. 9 embodiment, a gear 40a mounted on a shaft of the fixing roller 40 is meshed with a gear G of a motor M, so that the driving force is transmitted from the motor M to the fixing roller 40. Thus, in this case, the fixing roller 40 is a driving roller, while the pressing roller 43 is a driven roller which follows the rotation of the fixing roller 40.

In FIGS. 10 and 11, the fixing roller 40 and the pressing roller 43 are supported by bearings 45. The fixing roller 40 and the pressing roller 43 are supported by a frame of the image fixing device by way of the bearings 45.

The drive transmitting mechanism shown in FIGS. 10 and 11 are examples, and there are various other systems for driving the fixing roller or the pressing roller 43.

Figure 12:
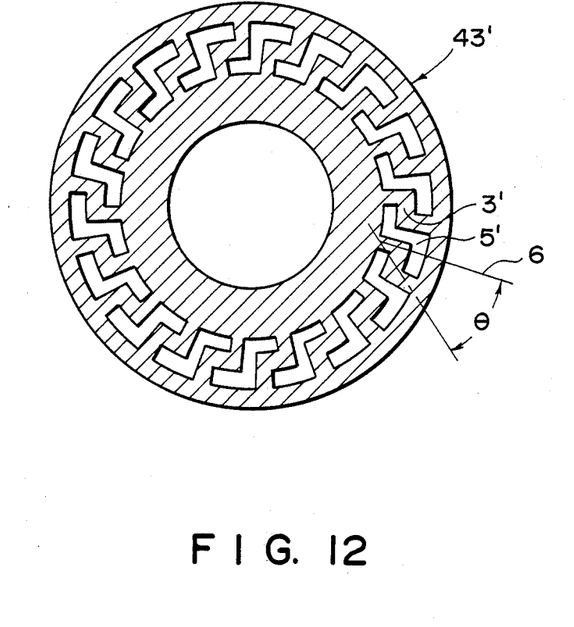
FIG. 12 is a sectional view of an elastic rotatable member as a pressing roller shown in FIGS. 10 and 11, according to a further embodiment of the present invention.

FIG. 12 illustrates another embodiment wherein the elastic roller is used as a pressing roller. In the embodiments shown in FIGS. 8 and 9, the elastic roller has post portions which are continuously inclined and have the same thickness, but the post portions are not always required to be continuously inclined. For example, they may be stepwise as shown in FIG. 12, wherein an image fixing roller to which the pressing roller 43' is to be press-contacted is omitted for the sake of simplicity. The post portions 3' are in the form of cranks, and accordingly, the openings 5' are in the form of cranks. The post portions 3' are inclined from a radial line 6 by an angle $\theta$ on the average.

When the roller of this embodiment is applied to the structures of FIGS. 8 and 9, and they are rotated in the directions described in detail in conjunction with those Figures, the elastic rollers are easily deformed with the degree of deformation uniform in the area of press-contact.

In any case, when the fixing roller 40 is a driving roller, and the pressing roller 43 is a driven roller, or when the fixing roller 40 is a driven roller, while the pressing roller 43 is a driving roller, the rollers are rotated in the direction described hereinbefore depending on the situation, whereby non-uniform and good property of image fixing can be provided.

In the foregoing embodiments, the elastic roller according to the present invention is used as a roller for image fixing, more particularly, a pressing roller, but the elastic roller according to the present invention is applicable to another roller such as a sheet conveying roller, a cleaning roller for cleaning a photosensitive member of an image forming apparatus and an electrically charging roller for charging a photosensitive member.

As described in the foregoing, according to the present invention, the elastic layer is provided with a plurality of openings extending longitudinally, wherein any radial line crosses at least two openings, and therefore, the hardness if very low but still is sufficient, and wherein the hardness is uniform over the entire surface of the roller. Therefore, the performance of the apparatus using the roller is remarkably enhanced with a high durability of the roller, with the result that the frequency of maintenance or servicing operations for the apparatus is decreased, thus reducing the required cost for the apparatus.

When the elastic roller according to this invention is used as a roller for image fixing, the area of press-contact is assured with uniform and good image fixing properties. Therefore, the present invention is particularly effective in an image fixing apparatus.

When the elstic roller according to this embodiment is manufactured, a metal mold of cylindrical shape having therein bar members having a shape corresponding to the openings, is used, into which rubber material is injected and is cured. Then, the bars are retracted together with a core metal. Therefore, it is easy to manufacture, thus reducing the manufacturing cost.

While the invention has been described with reference to the structures disclosed herein, it is not confined to the details set forth and this application is intended to cover such modifications or changes as may come within the purposes of the improvements or the scope of the following claims.

What is claimed is:

1. An elastic rotatable member, comprising:
a base member; and
an elastic rubber-like layer on said base member, said elastic layer defining a plurality of openings extending continuously in a longitudinal direction from adjacent one longitudinal end of the elastic rotatable member to adjacent the other end, wherein the openings are arranged such that any radial line in a cross-section of the elastic rotatable member in a direction substantially perpendicular to the longitudinal direction, crosses at least two of such openings.

2. A member according to claim 1, wherein said openings extend parallel to a longitudinal axis of the elastic rotatable member.

3. A member according to claim 1, wherein said openings extend inclined with respect to a longitudinal axis of the elastic rotatable member.

4. A member according to claim 1, wherein said openings extend conically along a longitudinal axis of the elastic rotatable member.

5. A member according to claim 1, wherein said openings are circumferentially distributed at substantially regular intervals.

6. A member according to claim 1, wherein said openings are arranged to extend in plural lines along a radial direction.

7. A member according to claim 1, wherein said elastic layer includes a base layer near said base member, a surface layer remote from the base member and post portions connecting said base layer and said surface layer, and wherein said openings are defined by said base layer, said surface layer and adjacent post portions.

8. A member according to claim 7, wherein said post portions are inclined from a radial line of the elastic rotatable member.

9. A member according to claim 7, wherein said surface layer has a thickness not less than 0.3 mm.

10. A member according to claim 9, wherein said surface layer has a thickness not more than 2 mm.

11. An elastic rotatable member, comprising:
a base member; and
an elastic rubber-like layer on said base member, said elastic layer defining a plurality of openings extending in a longitudinal direction of the elastic rotatable member, wherein the openings are arranged such that any radial line in a cross-section of the elastic rotatable member in a direction substantially perpendicular to the longitudinal direction, crosses at least two of such openings;
said elastic layer including a base layer near said base member, a surface layer remote from the base member and substantially linear post portions connecting said base layer and said surface layer, and wherein said openings are defined by said base layer, said surface layer and adjacent post portions;
said openings having a dimension measured along a radial direction which is larger than a thickness of said surface layer.

12. An elastic rotatable member, comprising:
a base member; and
an elastic layer on said base member, said elastic layer defining a plurality of openings extending in a longitudinal direction of the elastic rotatable member, wherein the openings are arranged such that any radial line in a cross-section of the elastic rotatable member in a direction substantially perpendicular to the longitudinal direction, crosses at least two of such openings;
said elastic layer including a base layer near said base member, a surface layer remote from the base member and post portions connecting said base layer and said surface layer, and wherein said openings are defined by said base layer, said surface layer and adjacent post portions;
said surface layer having a thickness not less than 0.3 mm; and
said post portions having a thickness not less than 0.2 mm and not more than the thickness of the surface layer.

13. A member according to claim 12, wherein said surface layer has a thickness not more than 2 mm.

14. An elastic rotatable member, comprising:
a base member; and
an elastic layer on said base member, said elastic layer defining a plurality of openings extending in a longitudinal direction of the elastic rotatable member, wherein the openings are arranged such that any radial line in a cross-section of the elastic rotatable member in a direction substantially perpendicular to the longitudinal direction, crosses at least two of such openings;

said elastic layer including a base layer near said base member, a surface layer remote from the base member and post portions connecting said base layer and said surface layer, and wherein said openings are defined by said base layer, said surface layer and adjacent post portions;

said openings having a trapezoidal configuration in cross-section.

15. An elastic rotatable member, comprising:

a base member; and an elastic rubber-like layer on said base member, said elastic layer defining a plurality of identical openings extending in a longitudinal direction of the elastic rotatable member, wherein the openings are arranged such that any radial line in a cross-section of the elastic rotatable member in a direction substantially perpendicular to the longitudinal direction, crosses at least two of such openings.

16. A member according to claim 15, wherein said openings have a total volume of 30-50% of the total volume of the elastic layer.

17. A rotatable member usable with an image fixing apparatus for fixing an unfixed image of an image carrying member, comprising:

a base member; and an elastic rubber-like layer on said base member, said elastic layer defining a plurality of openings extending continuously in a longitudinal direction from adjacent one longitudinal end of the rotatable member to adjacent the other end, wherein the openings are arranged such that any radial line in a cross-section of the rotatable member in a direction substantially perpendicular to the longitudinal direction, crosses at least two of such openings.

18. A member according to claim 1 or 17, wherein said elastic layer is an elastic rubber layer.

19. An image fixing apparatus for fixing an unfixed image on an image carrying member, comprising:

a first rotatable member;

a second rotatable member press-contacted to said first rotatable member to form a nip therebetween, through which the image carrying member bearing an unfixed image is passed to fix the image thereon;

wherein one of said first and second rotatable members is an elastic rotatable member which is elastically deformed by the pressure contact to the other rotatable member to form an area of press-contact for image fixing, and said elastic rotatable member has a base member and an elastic layer having a plurality of openings extending along a longitudinal direction of said rotatable member, and said openings are arranged such that any radial line in a cross-section in a direction substantially perpendicular to the longitudinal direction, crosses at least one of said openings;

driving means for driving said elastic rotatable member in such a direction that when it is driven, an inclination from a radial line of a portion of the elastic rotatable member between adjacent openings is increased, wherein the other rotatable member press-contacted to the elastic rotatable member is driven by the elastic rotatable member through a frictional engagement at the nip.

20. An apparatus according to claim 19, wherein any radial line in the cross-section crosses at least two of the openings.

21. An apparatus according to claim 18 or 20, wherein said openings are arranged circumferentially at substantially regular intervals.

22. An apparatus according to claim 19, wherein said elastic layer has a base layer near said base member, a surface layer remote from said base member and post portions connecting said base layer and said surface layer, wherein said openings are defined by said base layer, said surface layer and adjacent post portions, wherein the portions of the elastic member which are more inclined are said post portions.

23. An apparatus according to claim 22, wherein said openings are circumferentially distributed at substantially regular intervals.

24. An apparatus according to claim 22, said openings have a trapezoidal configuration in the cross-section.

25. An apparatus according to claim 19, wherein said elastic rotatable member is contactable to a side of the image carrying member which is opposite to an image curing side.

26. An image fixing apparatus for fixing an unfixed image on an image carrying member, comprising:

a first rotatable member;

a second rotatable member press-contacted to said first rotatable member to form a nip therebetween, through which the image carrying member bearing an unfixed image is passed to fix the image thereon;

wherein one of said first and second rotatable members is an elastic rotatable member which elastically deforms by the pressure contact to the other rotatable member to form an area of press-contact for image fixing, and said elastic rotatable member has a base member and an elastic layer having a plurality of openings extending along a longitudinal direction of said rotatable member, and said openings are arranged such that any radial line in a cross-section in a direction substantially perpendicular to the longitudinal direction, crosses at least one of said openings;

driving means for driving the other rotatable mark, wherein the elastic rotatable member press-contacted to the other rotatable member is driven by the other rotatable member through a frictional engagement at the nip, said elastic rotatable member is driven such that when it is driven, an inclination from a radial line of a portion of the elastic rotatable member between adjacent openings is increased.

27. An apparatus according to claim 26, wherein any radial line in the cross-section crosses at least two of the openings.

28. An apparatus according to claim 26 or 27, wherein said openings are arranged circumferentially at substantially regular intervals.

29. An apparatus according to claim 26, wherein said elastic layer has a base layer near said base member, a surface layer remote from said base member and post portions connecting said base layer and said surface layer, wherein said openings are defined by said base layer, said surface layer and adjacent post portions, wherein the portions of the elastic member which are more inclined as aforementioned are those post portions.

30. An apparatus according to claim 29, wherein said openings are circumferentially distributed at substantially regular intervals.

31. An apparatus according to claim 29, said openings have a trapezoidal configuration in the cross-section.

32. An apparatus according to claim 23, wherein said elastic rotatable member is contactable to a side of the image carrying member which is opposite to an image curing side.

33. An apparatus according to claim 19 or 26, wherein said elastic layer is an elastic rubber layer.

34. An elastic rotatable member, comprising:
a base member; and
an elastic layer on said base member, said elastic rubber-like layer defining a plurality of identical continuous openings extending in a longitudinal direction of the elastic rotatable member, the openings being formed by the elastic layer being separated from a mold, wherein the openings are arranged such that any radial line in a cross-section of the elastic rotatable member in a direction substantially perpendicular to the longitudinal direction, crosses at least two of such openings.

35. A member according to claim 34, wherein said elastic layer includes a base layer near said base member, a surface layer remote from the base member and post portions connecting said base layer and said surface layer, and wherein said openings are defined by said base layer, said surface layer and adjacent post portions.

36. A member according to claim 35, wherein said post portions are inclined from a radial line of the elastic rotatable member.

37. A member according to claim 35, wherein the dimension of said openings measured along a radial direction is larger than a thickness of said surface layer.

38. A member according to claim 35, wherein said surface layer has a thickness not less than 0.3 mm.

39. A member according to claim 38, wherein the post portions have a thickness not less than 0.2 mm and not more than the thickness of said surface layer.

40. A member according to claim 38, wherein said surface layer has a thickness not more than 2 mm.

41. A member according to claim 35, wherein the openings have a trapezoidal configuration in the cross-section.

42. A member according to claim 34, wherein the total volume of said openings is 20–60% preferably, 30–50% of a total volume of the elastic layer.

* * * * *

UNITED STATES PATENT AND TRADEMARK OFFICE
CERTIFICATE OF CORRECTION

PATENT NO. : 4,823,689

DATED : April 25, 1989

INVENTOR(S) : KAZUO KISHINO, ET AL.

It is certified that error appears in the above-identified patent and that said Letters Patent is hereby corrected as shown below:

IN [57] ABSTRACT

Line 3, "opening" should read --openings--.

COLUMN 1

Line 39, "at" should read --a--.

COLUMN 3

Line 16, "iouter" should read --outer--.
    Line 37, "ay" should read --any--.
    Line 56, "last" should read --post--.

COLUMN 4

Line 12, "thickness 2" should read --thickness t--.

COLUMN 6

Line 26, "particulrly," should read --particularly,--.

COLUMN 7

Line 40, "the" should read --that--.

UNITED STATES PATENT AND TRADEMARK OFFICE
CERTIFICATE OF CORRECTION

PATENT NO. : 4,823,689

DATED : April 25, 1989

INVENTOR(S) : KAZUO KISHINO, ET AL.

It is certified that error appears in the above-identified patent and that said Letters Patent is hereby corrected as shown below:

COLUMN 12

Line 4, "claim 18 or 20," should read --claim 19 or 20,--.

Line 18, "claim 22, said" should read --claim 22, wherein said--.

Line 44, "rotatable mark," should read --rotatable member,--.

COLUMN 13

Line 4, "claim 29, said" should read --claim 29, wherein said--.

Line 6, "claim 23," should read --claim 26,--.

Line 14, "elastic layer" should read --elastic rubber-like layer-- and "rub-" should be deleted.

Line 15, "ber-like" should be deleted.

Signed and Sealed this

Twenty-seventh Day of August, 1991

Attest:

HARRY F. MANBECK, JR.

*Attesting Officer*      *Commissioner of Patents and Trademarks*